United States Patent
Robison et al.

(10) Patent No.: US 12,158,802 B2
(45) Date of Patent: *Dec. 3, 2024

(54) CORRECTIVE DATABASE CONNECTION MANAGEMENT

(71) Applicant: eBay Inc., San Jose, CA (US)

(72) Inventors: Timothy David Robison, Orangevale, CA (US); Steven Bruce West, Roseville, CA (US); Sarang Mukund Kulkarni, Folsom, CA (US); Douglas Wayne Hathaway, El Dorado Hills, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/387,241

(22) Filed: Nov. 6, 2023

(65) Prior Publication Data

US 2024/0070013 A1    Feb. 29, 2024

Related U.S. Application Data

(63) Continuation of application No. 17/689,360, filed on Mar. 8, 2022, now Pat. No. 11,860,728, which is a (Continued)

(51) Int. Cl.
*G06F 11/00* (2006.01)
*G06F 11/07* (2006.01)

(52) U.S. Cl.
CPC ...... *G06F 11/0793* (2013.01); *G06F 11/0706* (2013.01); *G06F 11/0757* (2013.01)

(58) Field of Classification Search
CPC ............ G06F 11/0793; G06F 11/0706; G06F 11/0757
(Continued)

(56) References Cited

U.S. PATENT DOCUMENTS

| | | |
|---|---|---|
| 6,779,017 B1 | 8/2004 | Lamberton et al. |
| 7,065,556 B1 | 6/2006 | Hickey et al. |

(Continued)

FOREIGN PATENT DOCUMENTS

| | | |
|---|---|---|
| CN | 101207550 | 6/2008 |
| CN | 104380278 | 2/2015 |

(Continued)

OTHER PUBLICATIONS

US 10,999,359 B2, 05/2021, Robison et al. (withdrawn)
(Continued)

*Primary Examiner* — Sarai E Butler
(74) *Attorney, Agent, or Firm* — FIG. 1 Patents

(57) ABSTRACT

Systems and methods for are provided for predicting impending failure of a database and preemptively initiating mitigating failover actions, for example by shedding connections or redirecting connection requests to an alternate database that can fulfill resources being requested. In an example embodiment, to detect a slow or unstable database, connection wait times are monitored over a rolling window of time intervals, a quantity of intervals in which at least one excessive wait time event occurred are counted during the time window, and if the quantity exceeds a threshold, the database is deemed unavailable, thereby triggering connection adjustments.

20 Claims, 8 Drawing Sheets

Related U.S. Application Data continuation of application No. 16/510,792, filed on Jul. 12, 2019, now Pat. No. 11,301,316.

(58) Field of Classification Search
USPC .................................................. 714/1–57
See application file for complete search history.

(56) References Cited

U.S. PATENT DOCUMENTS

| | | |
|---|---|---|
| 7,269,607 B2 | 9/2007 | Cotner et al. |
| 7,426,576 B1 | 9/2008 | Banga et al. |
| 7,673,038 B2 | 3/2010 | Alvisi et al. |
| 8,019,732 B2 | 9/2011 | Paterson-Jones et al. |
| 8,413,156 B2 | 4/2013 | Kasten et al. |
| 8,504,522 B2 | 8/2013 | Wu et al. |
| 8,732,191 B2 | 5/2014 | Somogyi et al. |
| 8,874,609 B1 | 10/2014 | Singh et al. |
| 8,943,181 B2 | 1/2015 | Kasten et al. |
| 8,966,318 B1 | 2/2015 | Shah |
| 9,390,130 B2 | 7/2016 | Kakarlamudi et al. |
| 10,185,639 B1* | 1/2019 | Chatterjee ............ G06F 11/2092 |
| 10,592,322 B1* | 3/2020 | Seshadri .............. G06F 11/324 |
| 11,038,952 B2 | 6/2021 | Robison et al. |
| 11,301,316 B2 | 4/2022 | Robison et al. |
| 11,457,064 B2 | 9/2022 | Robison et al. |
| 11,860,728 B2 | 1/2024 | Robison et al. |
| 2002/0049842 A1 | 4/2002 | Huetsch et al. |
| 2003/0226056 A1* | 12/2003 | Yip ..................... G06F 11/0715 |
| | | 714/E11.003 |
| 2004/0172385 A1 | 9/2004 | Dayal |
| 2005/0114397 A1* | 5/2005 | Doshi ................... H04L 41/046 |
| 2006/0004733 A1 | 1/2006 | Zoltan et al. |
| 2006/0041794 A1 | 2/2006 | Aaron |
| 2006/0077724 A1 | 4/2006 | Chikusa et al. |
| 2006/0090004 A1 | 4/2006 | Nikolayev et al. |
| 2008/0010563 A1* | 1/2008 | Nishimura ............ G06F 9/4812 |
| | | 714/E11.003 |
| 2009/0109929 A1 | 4/2009 | Quan et al. |
| 2009/0177929 A1 | 7/2009 | Sijelmassi |
| 2009/0292953 A1 | 11/2009 | Barghouthi et al. |
| 2010/0332556 A1 | 12/2010 | Roy |
| 2011/0119325 A1 | 5/2011 | Paul et al. |
| 2012/0159259 A1* | 6/2012 | Klein ................... G06F 11/3419 |
| | | 714/E11.21 |
| 2012/0159267 A1* | 6/2012 | Gyorffy .............. G06F 11/0757 |
| | | 714/E11.024 |
| 2012/0210177 A1 | 8/2012 | Suginaka et al. |
| 2013/0238800 A1 | 9/2013 | Mcclement |
| 2014/0006846 A1 | 1/2014 | Wang et al. |
| 2014/0075164 A1* | 3/2014 | Indukuru ............ G06F 11/3419 |
| | | 712/E9.016 |
| 2014/0310418 A1 | 10/2014 | Sorenson, III et al. |
| 2015/0121136 A1 | 4/2015 | Namkoong et al. |
| 2015/0149831 A1 | 5/2015 | Chong et al. |
| 2015/0324259 A1 | 11/2015 | Bastawala et al. |
| 2016/0004571 A1 | 1/2016 | Smith |
| 2016/0085648 A1 | 3/2016 | Joshi et al. |
| 2016/0164980 A1 | 6/2016 | Kulkarni et al. |
| 2016/0224392 A1 | 8/2016 | Clarke et al. |
| 2017/0104629 A1 | 4/2017 | Cobb |
| 2017/0220431 A1 | 8/2017 | Joshi et al. |
| 2018/0019922 A1 | 1/2018 | Robison et al. |
| 2018/0020027 A1 | 1/2018 | Chen et al. |
| 2018/0060202 A1 | 3/2018 | Papak et al. |
| 2018/0157438 A1* | 6/2018 | Zhang .................. G06F 3/0604 |
| 2018/0219783 A1 | 8/2018 | Pfister et al. |
| 2019/0312931 A1 | 10/2019 | Greenwood |
| 2019/0342398 A1 | 11/2019 | Kasten et al. |
| 2020/0134069 A1 | 4/2020 | Chennen et al. |
| 2021/0011797 A1 | 1/2021 | Robison et al. |
| 2021/0014302 A1 | 1/2021 | Robison et al. |
| 2021/0194953 A1 | 6/2021 | Robison et al. |
| 2022/0188184 A1 | 6/2022 | Robison et al. |

FOREIGN PATENT DOCUMENTS

| | | |
|---|---|---|
| CN | 108292243 | 7/2018 |
| EP | 1180886 | 2/2002 |

OTHER PUBLICATIONS

"Non-Final Office Action", U.S. Appl. No. 16/510,781, filed Jun. 29, 2020, 11 pages.

U.S. Appl. No. 16/510,781, , "Applicant Initiated Interview Summary Received for U.S. Appl. No. 16/510,781, mailed on Nov. 17, 2020", Nov. 17, 2020, 3 Pages.

U.S. Appl. No. 16/510,781, , "Applicant Initiated Interview Summary Received for U.S. Appl. No. 16/510,781, mailed on Sep. 14, 2020", Sep. 17, 2020, 3 Pages.

U.S. Appl. No. 16/510,781, , "Corrected Notice of Allowability Received for U.S. Appl. No. 16/510,781, mailed on May 13, 2021", May 13, 2021, 2 Pages.

U.S. Appl. No. 16/510,781, , "Final Office Action Received for U.S. Appl. No. 16/510,781, mailed on Oct. 1, 2020", Oct. 1, 2020, 15 Pages.

U.S. Appl. No. 16/510,781, , "Notice Of Allowance received for U.S. Appl. No. 16/510,781, mailed on Jan. 4, 2021", Jan. 4, 2021, 11 Pages.

U.S. Appl. No. 16/510,781, , "Response to Final Office Action Filed on Dec. 1, 2020, for U.S. Appl. No. 16/510,781 mailed on Oct. 1, 2020", Dec. 1, 2020, 13 Pages.

U.S. Appl. No. 16/510,781, , "Response to Non-Final Office Action filed on Sep. 21, 2020 for U.S. Appl. No. 16/510,781, mailed on Jun. 29, 2020", Sep. 21, 2020, 14 Pages.

U.S. Appl. No. 16/510,792, , "Final Office Action Received for U.S. Appl. No. 16/510,792, mailed on Sep. 29, 2021", Sep. 29, 2021, 12 Pages.

U.S. Appl. No. 16/510,792, , "Non Final Office Action Received for U.S. Appl. No. 16/510,792, mailed on Apr. 1, 2021", Apr. 1, 2021, 24 Pages.

U.S. Appl. No. 16/510,792, , "Notice of Allowance Received for U.S. Appl. No. 16/510,792, mailed on Dec. 8, 2021", Dec. 8, 2021, 10 pages.

U.S. Appl. No. 17/192,361, , "Non Final Office Action Received for U.S. Appl. No. 17/192,361, mailed on Dec. 17, 2021", Dec. 17, 2021, 24 Pages.

U.S. Appl. No. 17/192,361, filed May 18, 2022, , "Notice of Allowance", U.S. Appl. No. 17/192,361, filed May 18, 2022, 8 pages.

U.S. Appl. No. 17/689,360, filed Mar. 30, 2023, , "Final Office Action", U.S. Appl. No. 17/689,360, filed Mar. 30, 2023, 28 pages.

U.S. Appl. No. 17/689,360, , "Non-Final Office Action", U.S. Appl. No. 17/689,360, 13 pages.

U.S. Appl. No. 17/689,360, filed Sep. 29, 2022, , "Non-Final Office Action", U.S. Appl. No. 17/689,360, filed Sep. 29, 2022, 26 pages.

U.S. Appl. No. 17/689,360, filed Aug. 18, 2023, , "Notice of Allowance", U.S. Appl. No. 17/689,360, filed Aug. 18, 2023, 9 pages.

202010657311.0, , "Office Action received for Chinese Patent Application No. 202010657311.0, mailed on Jun. 27, 2023", Jun. 27, 2023, 7 pages.

Schaumann, Jan , "L3DSR-Overcoming Layer 2 Limitations of Direct Server Return Load Balancing", Norther American Network Operators' Group 51, Miami, Jan. 30, 2011, 33 pages.

* cited by examiner

| Events | Status | Label |
|---|---|---|
| 1 event | DIRTY | 401A |
| 0 events | CLEAN | 401B |
| 90 events | DIRTY | 401C |
| 3 events | DIRTY | 401D |
| 0 events | CLEAN | 401E |
| events | CLEAN | 401F |
| 1 event | DIRTY | 401G |
| 4 event | DIRTY | 401H |
| 5 event | DIRTY | 401I |
| 0 events | CLEAN | 401J |
| 40 events | DIRTY | 401K |
| 8 events | DIRTY | 401L |
| 11 events | DIRTY | 401M |
| 7 events | DIRTY | 401N |
| 4 events | DIRTY | 401O |
| 2 events | DIRTY | 401P |
| 1 event | DIRTY | 401Q |
| 0 events | CLEAN | 401R |
| 1 events | DIRTY | 401S |
| 1 events | DIRTY | 401T |
| 1 events | DIRTY | 401U |
| 0 events | CLEAN | 401V |
| 5 events | DIRTY | 401W |
| 1 events | DIRTY | 401X |
| 0 events | CLEAN | 401Y |
| 1 events | DIRTY | 401Z |
| 1 events | DIRTY | 401AA |
| 0 events | CLEAN | 401BB |
| 0 events | CLEAN | 401CC |
| 1 event | DIRTY | 401DD |
| 0 events | CLEAN | 401EE |
| 0 events | CLEAN | 401FF |

INTERVAL = t (covering 401A–401D)

EVALUATION TIME WINDOW = W(t)

FIGURE 4

CORRECTIVE DATABASE CONNECTION MANAGEMENT

RELATED APPLICATIONS

This application is a continuation of and claims priority to U.S. patent application Ser. No. 17/689,360, filed Mar. 8, 2022, which claims priority to U.S. patent application Ser. No. 16/510,792, filed Jul. 12, 2019, now U.S. Pat. No. 11,301,316, the entire disclosures of which are hereby incorporated by reference herein in its entirety.

BACKGROUND

Maintaining operational uptime of databases is critical, particularly in data systems supporting e-commerce websites. Increasing popularity of Web-based services and applications has resulted in a rapid increase in demand for connections to databases that support such sites. Database design limitations present scaling issues, as a particular database typically has a finite number of possible connections, yet adding database instances is expensive and complex. To handle growing traffic and corresponding demands for limited database connections without adding new databases, techniques have been implemented in servers to more efficiently utilize these limited connections in order to handle ever-increasing requests for data to be retrieved from databases. Such techniques include connection pooling and multiplexing, for example. These techniques have enabled databases to support more traffic. In turn, this means that more users will experience a service disruption should a database failure occur. A problem with large data systems is that databases occasionally fail due to overloading or other issues. In some conventional systems, a server will determine that a database is down because the server is unable to connect to it, at which point the database has failed. Some systems initiate failover protocols after a such failure has been detected, although this typically does not avoid a significant service interruption by way of undesirable client wait times or unfulfilled data requests.

It is desirable to avoid such database failures. Moreover, where database failures occur, it is desirable to manage connection traffic so as to minimize service disruption. As is evident, there is a need for improvements in detecting database health and how connection requests are managed.

SUMMARY

Techniques described herein enable detection of early signs that a database is unhealthy or beginning to fail, effectively predicting a more serious potential failure. When such early signs are detected, it is possible to trigger corrective actions to gracefully manage connections and connection requests so as to mitigate potential negative impacts.

In one example, database failure prediction is achieved by determining that connection wait times to execute database queries are increasing, which is an early warning sign that the database is about to fail, and when certain thresholds are reached the database is considered to be down or unhealthy. Furthermore, utilizing a distributed connection service that manages connection requests across multiple databases, techniques are also described for mitigating actions or failover flows that can be triggered upon the detection that a database is unhealthy. Such actions can preemptively adjust the flow of connection requests to optimize query response times, minimize service interruptions, and potentially reverse the declining performance of database beginning to fail due to overloading.

In an embodiment, flexible optimization across a large data system is enabled by implementing these techniques in the distributed connection service architecture, utilizing one or more connection servers executing the distributed service positioned intermediately between application servers and databases. This provides the service with a complete view over connection management, enabling the service to receive requests from many application clients as well as monitor performance and manage connections across multiple databases. The connection service includes a database connection pool and a connection manager that can adjust the pool and manage how data requests are handled depending on database health conditions.

In some embodiments, connection wait times to execute data queries at a database are monitored in discrete time intervals, and determinations are made as to whether thresholds are exceeded during each interval, and then how many intervals had excessive wait times over a broader time window comprising a series of the intervals. The time window is continually refreshed at each new time interval.

In such an embodiment, for example, the connection service receives database connection requests from a plurality of application servers and directs the requests to a first database. The connection service accesses metrics data including a wait time for each database connection request describing how long the request waited until being serviced by an open connection at a first database then determines if at least one of the wait times occurring during the time window exceeds a wait limit. Such an interval in which the wait time of at least one connection event exceeded the wait limit can be flagged as "dirty", by comparison to an interval during which no wait time exceeded the wait limit which is considered "clean." During a time window that comprises a series of the time intervals, a quantity of intervals are counted during which the wait time limit was exceeded at least once—the "dirty" intervals. The first database is determined to be unhealthy if the quantity exceeds predetermined count threshold during the time window. Based on the determination that the first database is unhealthy, one or more mitigating actions can be triggered.

In an embodiment, the mitigating action can include redirecting new connection requests to a second database. This optimizes fulfillment times by servicing requests at a database operating normally, sparing the requests from experiencing the longer wait times of the first database. Also, redirecting requests avoids exacerbating an overloaded condition of the first database. An implementation of this involves notifying the plurality of application servers that the first database is unavailable for connection requests. From such information, the application servers direct queries to an alternate database instead of the first database.

In some embodiments, the connection service determines if wait times during an interval have exceeded the wait limit is likely due to a spike in traffic. The connection service can exclude such spikes from the determination of database health. In some implementations, the normally operating database can be allowed to process through the long queue of requests caused by a temporary traffic surge. In some implementations, the connection service can shed connections when the database queue is backed up to prevent resource saturation. In one example, the wait times metrics data also includes a volume of requests received by the first database per interval, and when intervals during which the volume of requests exceeds a volume threshold are excluded from the quantity of the counting operation.

In some embodiments, after a first database has been deemed unavailable and failover flows have redirected requests to alternate resources, the service checks the health status of the first database for readiness to restore operation and traffic flow. A staggered reloading technique is described herein for restoring operation of the database gracefully, preventing an undesirable thundering herd effect that could overwhelm database resources if all resource requests were immediately allowed to connect. For example, the connection service periodically checks one or more performance parameter of the first database to determine if the database is healthy. If the database is determined to be healthy, a predetermined portion of connection requests from the plurality of application servers are allowed to connect to the first database. A remainder of the requests are caused to wait a predetermined delay period before those requests are connected to the first database. In one example, the predetermined portion of connections allowed to connect is about 15%, and the predetermined delay period is about 10 seconds, although other proportions and delay times could be used. In one example, the performance parameter includes the wait time for at least one dummy connection request, and the first database is determined to be healthy if the wait time does not exceed the wait limit.

Further techniques are described that implement tiered shedding of connections from a database that is showing signs of failure. Such tiered shedding can reduce the load on a slowing database in order to allow it to continue serving connections considered to be a highest priority, limiting connection interruptions to tiers that are lower in priority. In such an embodiment, each database connection request has one of a plurality of ranks, the plurality of ranks defining priority for maintaining the connection, the ranks at least including a lowest rank and a next-higher rank. These ranks may be assigned, for example, by the application server. The assigned ranks can be based on a variety of factors suitable to determining the priority of connections within the particular operating environment. When the first database is determined to be unhealthy, the connection service further designates a degree of unhealthiness based on one or more factors including by how much the quantity exceeds the predetermined count threshold during the time window. Based upon the degree of unhealthiness, mitigating actions are triggered to shed one or more tiers of connections from the database, reducing the load on the database resources and allowing the database to continue processing fulfillment of connected requests in one or more remaining tiers. For example, the mitigating actions include terminating connections assigned the lowest rank if the degree of unhealthiness exceeds a first shed threshold corresponding to the lowest rank; and terminating connections assigned to the next-higher rank if the degree of unhealthiness exceeds a second shed threshold corresponding to the next-lowest rank.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 4 is a diagram illustrating a series of time intervals covering an evaluation time window according to an example embodiment.

DETAILED DESCRIPTION

The techniques described herein enable prediction of database failure through early detection of failure signals, and in turn, allow actions to minimize service interruption and potentially reverse the declining performance of an overloaded database.

Figure 1:
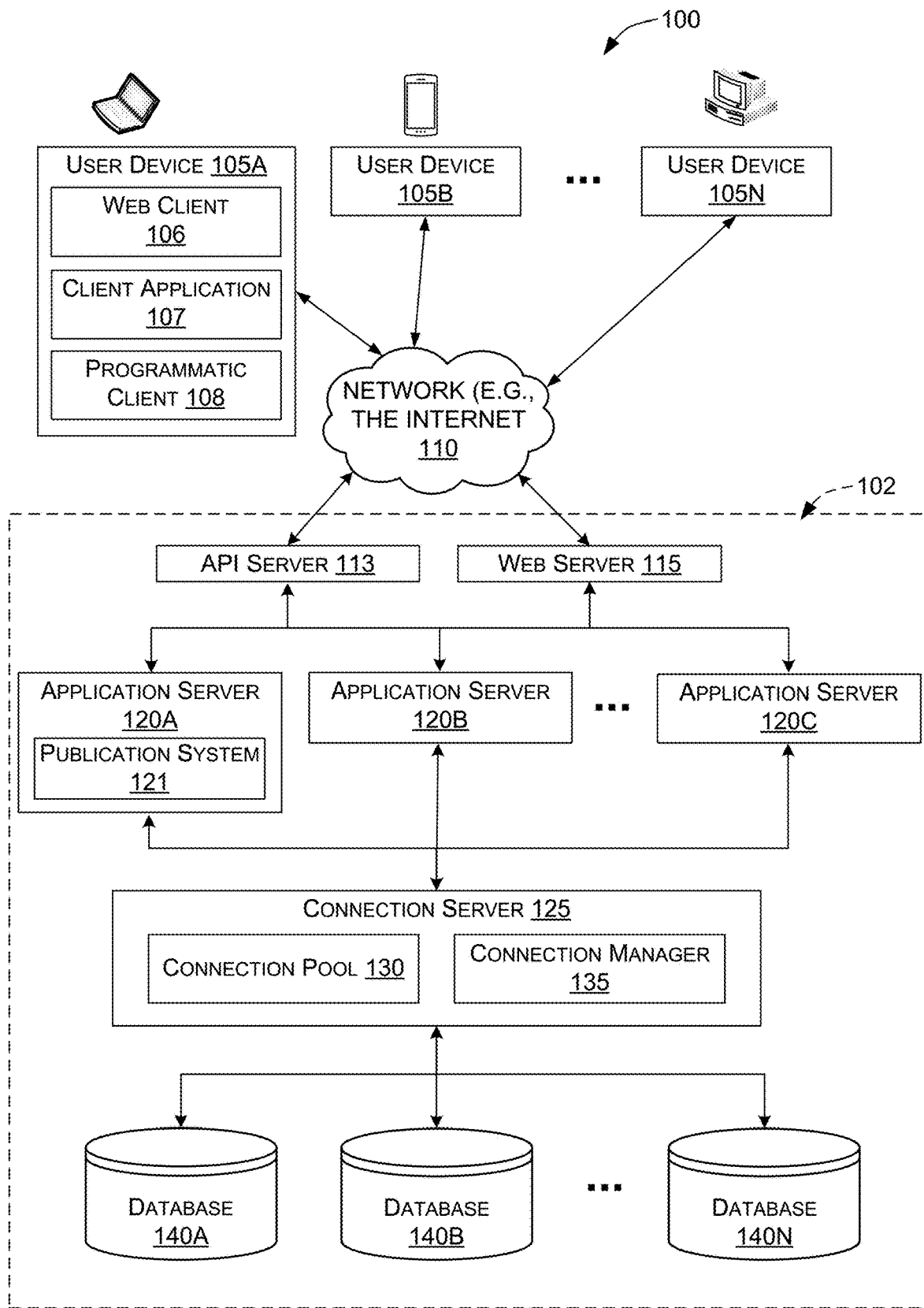
FIG. 1 is a block diagram illustrating a networked system, according to some example embodiments.

With reference to FIG. 1, an example embodiment of a high-level client-server-based network architecture 100 is shown. A networked system 102 provides server-side functionality via a network 110 (e.g., the Internet or wide area network (WAN)) to one or more user devices 105A-N. In some implementations, a user interacts with the networked system 102 using the user device 105A-N and the user device may execute a web client (e.g., a browser), a client application, or a programmatic client. The user device 105A-N may be a computing device that includes a display and communication capabilities that provide access to the networked system 102 via the network 110.

Although only three user devices 105A, 105B and 105N are illustrated in FIG. 1, the network architecture 100 can accommodate communication with many user devices. The user device 105A-N can be, for example, a smart phone, a laptop, desktop computer, general purpose computer, tablet, a remote device, work station, Internet appliance, hand-held device, wireless device, portable device, wearable computer, smart TV, game console, set-top box, network Personal Computer (PC), mini-computer, and so forth.

The user device 105A-N communicates with the network 110 via a wired or wireless connection. For example, one or more portions of the network 104 comprises an ad hoc network, an intranet, an extranet, a Virtual Private Network (VPN), a Local Area Network (LAN), a wireless LAN (WLAN), a WAN, a wireless WAN (WWAN), a Metropolitan Area Network (MAN), a portion of the Internet, a portion of the Public Switched Telephone Network (PSTN), a cellular telephone network, a wireless network, a Wireless Fidelity (WI-FIR) network, a Worldwide Interoperability for Microwave Access (WiMax) network, another type of network, or any suitable combination thereof.

In some example embodiments, the user device 105A-N includes one or more of the applications (also referred to as "apps") such as, but not limited to, web browsers, book reader apps (operable to read e-books), media apps (operable to present various media forms including audio and video), fitness apps, biometric monitoring apps, messaging apps, electronic mail (email) apps, and e-commerce site apps. In some implementations, a user application may include various components operable to present information to the user and communicate with networked system 102. In some example embodiments, if the e-commerce site application is included in the user device 105A-N, then this application is configured to locally provide the user interface and at least some of the functionalities with the application configured to communicate with the networked system 102, on an as needed basis, for data or processing capabilities not locally available (e.g., access to a database of items available for sale, to authenticate a user, to verify a method of payment). Conversely, if the e-commerce site application is not included in the user device 105A-N, the user device 105A-N can use its web browser to access the e-commerce site (or a variant thereof) hosted on the networked system 102.

Each of the user devices 105A-N can utilize a web client 106 to access the various systems of the networked system 102 via the web interface supported by a web server 115. Similarly, the user device can utilize a client application 107 and programmatic client 108 to accesses various services and functions provided by the networked system 102 via a programmatic interface provided by an Application Program Interface (API) server 113. The programmatic client can, for example, be a seller application (e.g., the Turbo Lister application developed by EBAY® Inc., of San Jose, Calif.) to enable sellers to author and manage listings on the networked system 102 in an off-line manner, and to perform batch-mode communications between the programmatic client 108 and the networked system.

The API server 113 and the web server 115 are coupled to, and provide programmatic and web interfaces respectively to, a plurality of application servers 120A-N. The application servers 120A-N can host one or more publication system 121. The application servers 120A-N are, in turn, shown to be networked with a connection server 125 executing a connection service that manages connections to a plurality of databases 140. The connection server 125 can comprise a connection pool 130 having a number of database connections, including open connections and connections in use. Different network components, third party applications, client applications, and/or publication systems executing on the application servers 120A-N may transmit database connection requests to connection server 125. If connections are available in the connection pool system 130, the connection server 125 serves the open connections to the request applications, which may use the connections to retrieve query data from databases 140A-N, managed by the connection server 125. The connection server 125 includes a connection adjuster 135 that can comprise a number of engines, each of which can be embodied as hardware, software, firmware, or any combination thereof. In an example embodiment, the databases 140A-N are storage devices that store information to be posted (e.g., publications or listings) to the publication system on the application server 120A-N. The databases 140A-N also store digital good information in accordance with some example embodiments.

Additionally, it is noted that one or more of the user devices 105A-N can be a third party server executing a third party application, which third party application may have programmatic access to the networked system 102 via a programmatic interface provided by the API server 113. For example, the third party application, utilizing information retrieved from the networked system 102, supports one or more features or functions on a website hosted by the third party.

The publication system executing on the application server 120A-N provides a number of publication functions and services to the users that access the networked system 102. While the publication system 121 may form part of the networked system 102, it will be appreciated that, in alternative example embodiments, the publication system may form part of a service that is separate and distinct from the networked system 102. Further, in some example embodiments, the components and logical functionality of the connection pool 130 and connection adjuster 135 may be implemented in a distributed service operating on a plurality of machines, or alternatively, may be integrated into existing servers, such as application servers 120A-N.

Further, while the client-server-based network architecture 100 shown in FIG. 1 employs a client-server architecture, the present inventive subject matter is, of course, not limited to such an architecture, and can equally well find application in a distributed, or peer-to-peer, architecture system, for example. The various systems of the application server 120A-N (e.g., the publication system) can also be implemented as standalone software programs, which do not necessarily have networking capabilities.

Figure 2:
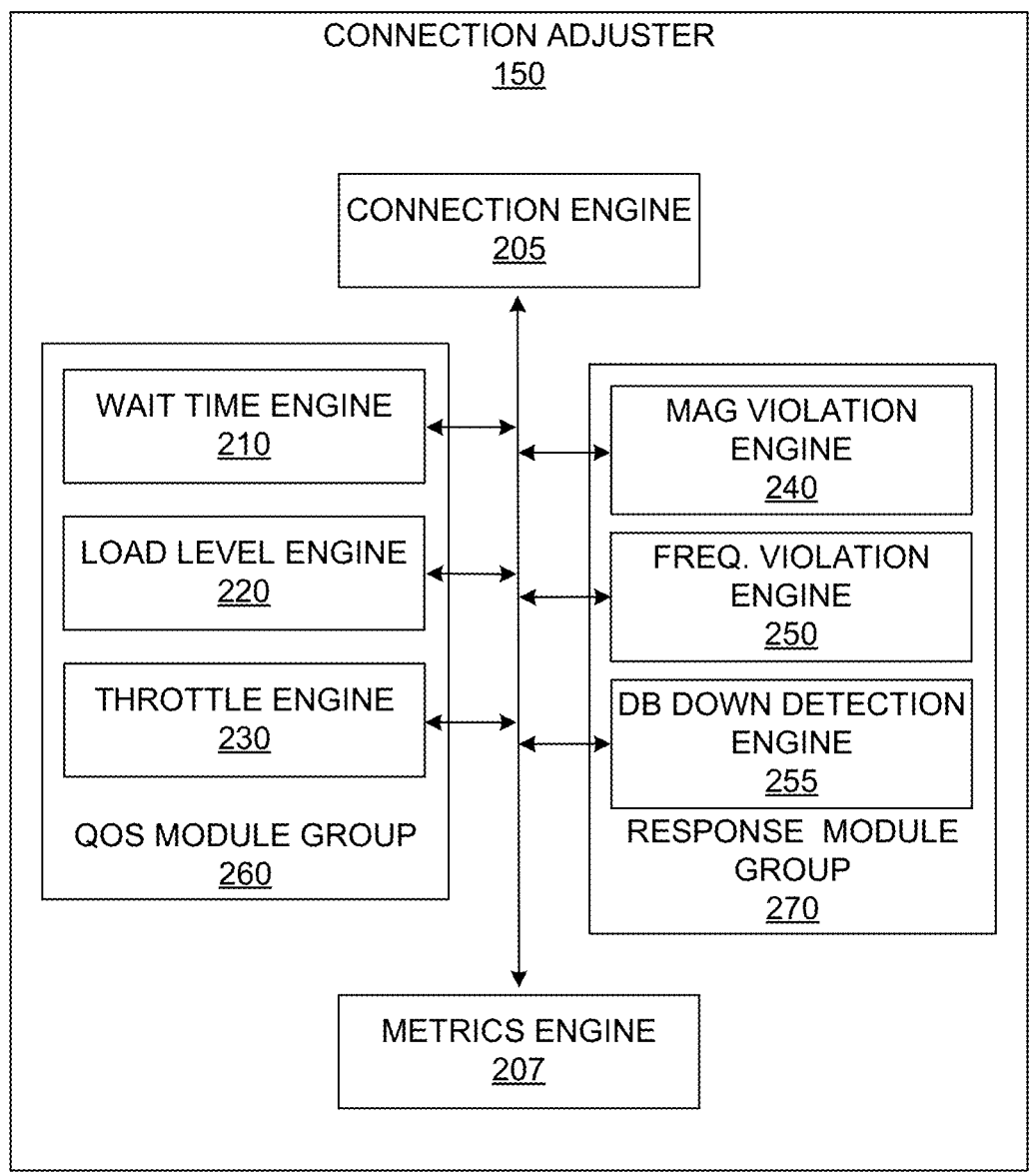
FIG. 2 is a block diagram showing example components provided within the system of FIG. 1, according to some example embodiments.

FIG. 2 illustrates a block diagram showing components provided within the connection adjuster 135, according to some example embodiments. The connection adjuster 135 can be stored on non-transitory memory of a hosting system (e.g., connection server 125), or may be hosted on dedicated or shared server machines that are communicatively coupled to enable communications between server machines to operate the functionality of the connection server as a distributed service. As such a distributed service, the connection server 125 can operate with broad resource visibility and control to manage connections across an entire data center or multiple data centers. The components themselves are communicatively coupled (e.g., via appropriate interfaces) to each other and to various data sources, so as to allow information to be passed between the applications or so as to allow the applications to share and access common data.

FIG. 2 illustrates components of the connection adjuster 135, according to some example embodiments. As illustrated, the connection adjuster 135 may comprise a connection engine 205, a quality-of-service (QOS) module group 260 and a response module group 270.

The connection engine 205 receives incoming database connection requests from applications 120A-N (e.g., publication system 121 or client application 107) and adds or terminates open database connections in the connection pool 130 (FIG. 1) based on demand or instructions from the other modules. In at least one example embodiment, the connection engine 205 receives inputs from the QOS module group 260 and the response module group 270, modifies the number of open database connections in the connection pool based on the received inputs from the groups. Furthermore, the connection engine 205 modifies connections and traffic flow among the multiple databases 140A-N based upon detection of impending database failure or instability, as will be described in greater detail below.

A metrics engine 207 records metrics describing connections to the databases 140A-N and stores the recorded metrics as connection metrics data. The connection metrics data includes wait time data, connection use time data, and request frequency data, according to some example embodiments. The wait time data describes how long past database connection requests had to wait before receiving a database connection (e.g., how long before being serviced by the connection engine). The connection use time data describes how long past database connections were open or used by an application. The request frequency data describes the rate at which incoming database connection requests are received from the applications.

The QOS module group 260 is responsible for monitoring database connection requests, analyzing connection pool metrics, and generating instructions for the pool connection engine 205 to open, close, or throttle the amount of newly created connections. As illustrated, the QOS module group 260 comprises a wait time engine 210, a load level engine 220, and a throttle engine 230.

Still referring to FIG. 2, each of the modules is discussed in further detail below, but is explained here briefly in a high-level manner. The wait time engine 210 determines, for each of the databases 140A-N (FIG. 1), whether the time that past database connection requests waited before being serviced surpasses a wait time threshold. If the wait time threshold is exceeded, the wait time engine 210 instructs the connection engine 205 to create new database connections in the connection pool 130. The load level engine implements an equilibrium equation that, for each of the databases 140A-N (FIG. 1) uses database connection traffic density to calculate a load level. If the load level limit is exceeded, the load level engine 220 instructs the connection engine 205 to create new database connections to the respective database in the connection pool 130. The throttle engine 230 works as a type of safeguard against too many new connections being created at a time. For example, according to one example embodiment, the throttle engine analyzes, for each of the databases 140A-N (FIG. 1) the number of new connections being ordered open by the wait time engine 210 and load level engine 220 and throttles the amount of connections being opened in steps, thereby alleviating an overloaded database instance.

The response module group 270 is responsible for correcting inefficient predictions and/or handling of new database connections for connection pool management as ordered by modules of the QOS module group 260. The response module group 270 is further responsible for analyzing metrics data to determine, for each database, if the database is becoming unstable or going to fail, which would lead to service interruptions and significant QOS violations.

As illustrated, the response module group 270 comprises a magnitude violation engine 240, a frequency violation engine 250, and a database down detection engine 255. Generally, applications requesting database connections may subscribe to different quality-of-service or service-level agreements (SLAs), whereby developers/administrators of the applications may pay increasingly more money for increasingly higher performance database access. In some implementations, the quality of service may be arranged in tiers, for example, bronze tier database access, silver tier database access, and gold tier database access, where silver tier access applications are assured better database performance than bronze tier access applications, and gold tier access applications are assured better database performance than applications subscribed to the silver and gold tiers. Although three tiers are discussed as an example here, it is appreciated that any number of tiers and granularity can be implemented in a similar manner.

The magnitude violation engine 240 is configured to determine whether QOS levels for applications are being violated and by how much (e.g., by what magnitude). If QOS violations of significant magnitude are found in the metrics data, the magnitude violation engine 240 instructs the wait time engine 210, load level engine 220, and throttle engine 230 to take corrective actions (e.g., by lowering the wait time threshold, lowering the load level, and by increasing the amount of throttling, respectively).

The frequency violation engine 250 is configured to determine whether QOS levels for applications are frequently being violated. For example, while a single large magnitude violation may not have occurred, a number of small violations may have occurred over a small period of time.

Repetitive violations, however large the size, can signify that the connection creation/termination instructions ordered by the QOS modules is inefficient or problematic. Responsive to determining that too many QOS violations are occurring in too small an amount of time, the frequency violation engine 250 may instruct the QOS module group 260 to take corrective actions (e.g., by lowering the wait time threshold, lowering the load level, and increasing the amount of throttling).

The database down detection engine 255 is configured to determine, for each database 140A-N, if metrics data is showing early signs that a particular database is becoming unstable or leading to partial or full failure. For example, increased response times during a certain quantity of intervals over a time periods is a condition found to be consistent with a database that is becoming unstable and is going to fail. If the database down detection engine 255 determines that one of the databases is going to fail, it can initiate instruct the connection engine to implement adjustments to maintain optimal system performance, for example by redirecting requests to an alternate database or shedding connections, as will be described in greater detail with reference to FIGS. 3-7.

Hereinafter, a more detailed discussion of the operation of the systems and components described above is provided with reference to flow diagrams. As illustrated in FIGS. 3, 5, 6, and 7 aspects of routines 300, 500, 600 and 700 to provide database health detection, mitigating actions to adjust connections that may be triggered, and reloading a database that had been previously unavailable. It should be understood that the operations of the routines and methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated routines can end at any time and need not be performed in their entireties. Some or all operations of the routines, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system.

Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routines 300, 500, 600 and 700 are described herein as being implemented, at least in part, by system components, which can comprise an application, component and/or a circuit. In some configurations, the system components include a dynamically linked library (DLL), a statically linked library, functionality produced by an application programing interface (API), a compiled program, an interpreted program, a script or any other executable set of instructions. Data, such as the audio data, 360 canvas and other data, can be stored in a data structure in one or more memory components. Data can be retrieved from the data structure by addressing links or references to the data structure.

Although the following description refers to the elements of FIGS. 1, 2 and 4, it can be appreciated that the operations of the routines 300, 500, 600, and 700 may be also implemented in many other ways. For example, the routines 300, 500, 600, and 700 may be implemented, at least in part, by a processor of another remote computer or a local circuit. In addition, one or more of the operations of the routines 300, 500, 600, and 700 may alternatively or additionally be implemented, at least in part, by a chipset working alone or in conjunction with other software modules. Any service, circuit or application suitable for providing the techniques disclosed herein can be used in operations described herein.

Figure 3:
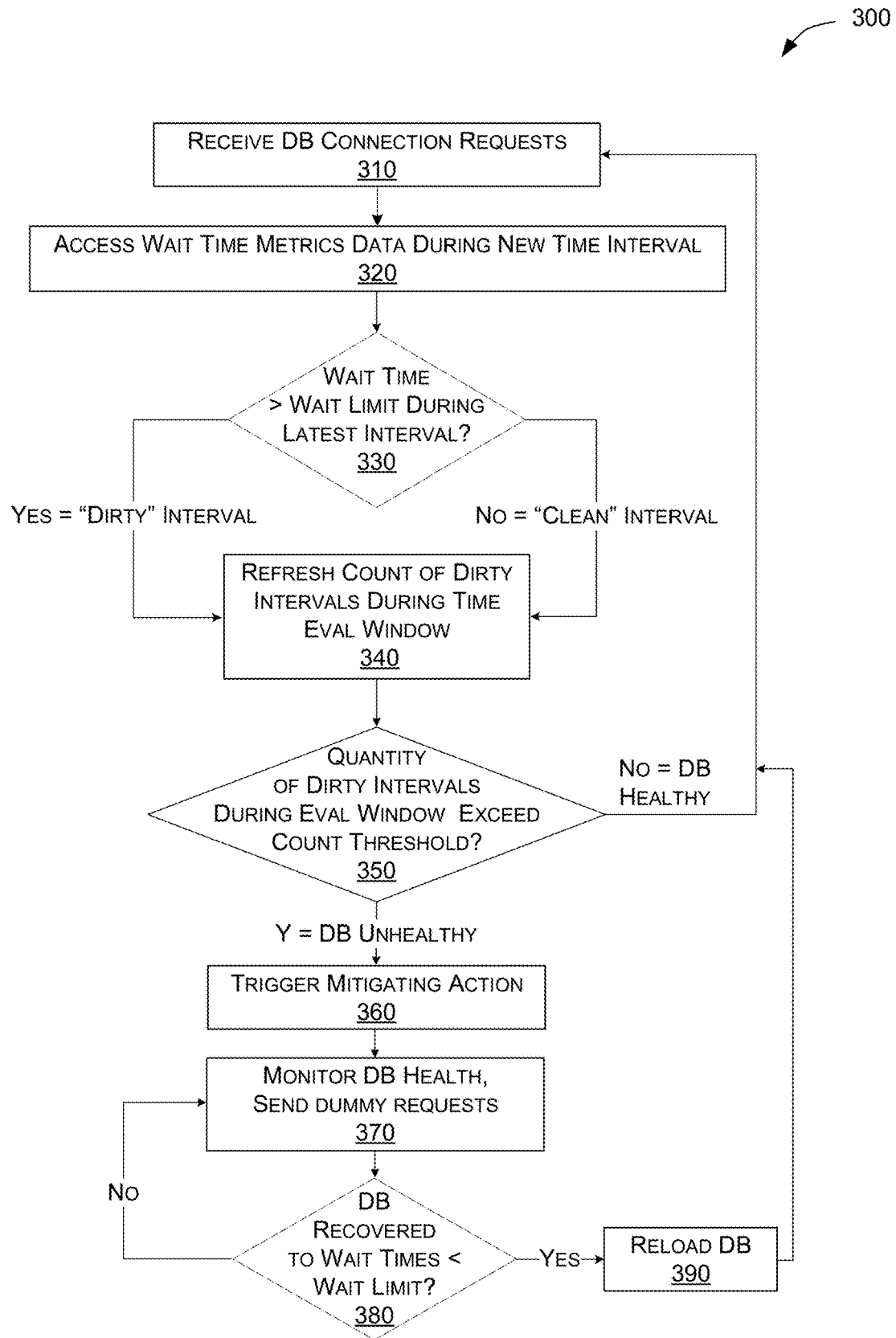
FIG. 3 is a flow chart illustrating an example method for predicting a database is going down.

FIG. 3 is a flow diagram of a routine 300 to detect early signs of impending database failure or instability and to implement related operations such as connection adjustments and database reloading to optimize traffic handling in a networked data system, according to some example embodiments. The routine 300 begins at operation 310, the connection adjuster 135 receives database connection requests from applications. At 320, the database down detection engine 255 accesses wait time data from the connection pool metrics data. The database down detection engine 255 analyzes the metrics data to determine, for each database, if the wait times are being repeatedly exceeded within a degree of consistency over a series of time intervals. A change in query response times alone does not necessarily suggest an unreliable database condition, as there is a wide variance in response times from a database that is operating normally. For example, although a temporary spike in traffic ingress might result in excessive wait times momentarily, but a normally operating database can return to operating within normal wait times. Thus, according to exemplary techniques, wait times are not merely analyzed at specific moments, but wait times are analyzed over a series of intervals in order to identify conditions consistent with a database that is not healthy. For example, at operation 330, the database down detection engine 255 determines based on the metrics data if a wait time of at least one connection event to the database exceeded a wait time limit during the latest, most recent time interval. A suitable amount of time for the time interval can be, for example, one second, however the interval could be a longer or shorter time duration. Intervals analyzed at operation 330 are identified as having one of two conditions, for purposes of this discussion referred to as being either "clean" or "dirty". A dirty interval includes at least one connection wait time event that exceeded the wait limit, whereas a "clean" interval included zero connection wait time events that exceeded the wait limit.

A wait time that exceeds the wait limit is a wait time violation event, indicating that the wait time exceeds an acceptable normal range for quality of service. In practice, the range of normal wait times varies widely depending on the particular database, equipment, and operating environment. By way of example, however, for some database implementations a suitable wait limit may be 1000 ms.

At operation 340, upon each new time interval, the intervals are assessed over a time evaluation window. The time evaluation window is defined by a fixed number of time intervals in a series, including the latest interval and previously occurring intervals to span the duration of the time evaluation window. More particularly, the dirty intervals during the time window are counted to yield a quantity. Operation 350 determines if the quantity of dirty intervals during the current time window exceeds a count threshold. If the quantity does not exceed the count threshold, the database is determined to be healthy, and database connections continue as normal. If the quantity exceeds the count threshold, the database is considered to be unhealthy, as the wait time conditions over the time window reflect early signs that the database is becoming unstable or will fail. As a result of the determination that the database is unhealthy, the connection engine 205 treats the database as unavailable for handling incoming data requests.

The designation of a database as unhealthy at operation 350 is a predictive flag that the database, while still operational, is in a stage of partial failure that may worsen if current conditions continue. This predictive information enables the implementation of preemptive corrective adjustments in an effort to avoid a full failure of the database while minimizing service disruptions of the overall data system. Such preemptive corrective adjustments are also referred to herein as mitigating actions.

At operation 360, the determination that the database is unhealthy (operation 350) triggers a mitigating action implemented by the connection engine 205 (FIG. 2). A mitigating action, sometimes referred to as a failover action, can be any of a variety of connection adjustment actions to expected to yield one or more overall system performance improvements in view of problems with the database, such as to alleviate load on the failing database, cause requests to connect to an alternate database, or preserve persistent connections for high priority data requests under partial failure conditions where the database can still operate to service some connections. Exemplary operations 360A and 360B are described below as processes 500 and 600 with reference FIGS. 5 and 6.

Referring still to FIG. 3, operation 370 monitors the health of a database that has been flagged as unhealthy. Among other tests, this can include sending dummy connection requests to the database to see if a connection is available, and if so whether the wait time is within normal ranges. The database down detection engine 255 (FIG. 2)

periodically checks one or more health parameters of the database 140A-N (FIG. 1). Operation 380 determines if the database has recovered sufficiently to handle normal traffic. If the database has not recovered, operation 370 resumes monitoring the health of the database. If the database has recovered, at operation 390 the database is reloaded. Various techniques are possible for reloading the database at operation 390, and one example is described below with reference to FIG. 6.

Turning to FIG. 4, an exemplary series 400 of time intervals 401A-FF covering a time evaluation window is illustrated. Each of the time intervals 401A-FF has a time duration t, for example, one second. The time evaluation window comprises an amount W of intervals, so that the time evaluation window covers a time span W(t). Where W is thirty intervals and each interval t=1 second, as in the example shown, the time window covers thirty seconds. As illustrated, interval 401A shown at the top of FIG. 4 is the latest and most recent, and previously occurring intervals 401B-401FF are sequentially older. The time window W(t) is shown as spanning thirty intervals, from the most recent interval 401A to the thirtieth interval 401DD. Time intervals 401EE and 401FF at the bottom of the series are more than thirty seconds old, and are thus outside of the time window. Upon each new time interval, a new interval takes the place of 401A and the stack moves down.

FIG. 4 further indicates next to each of the time intervals 401A-FF a number of connection events that exceeded the time limit during the interval, and whether the interval is "clean" or "dirty" as a result. For example, time interval 401A had 1 connection wait time event that exceeded the wait limit and is labeled "dirty", time interval 401B had zero connection wait time event that exceeded the wait limit and is labeled "clean", time interval 401C had 90 connection wait time events that exceeded the time limit and is labeled "dirty", and so on. In the illustrated example, the time window includes a quantity of twenty-one dirty time intervals: 401A, 401C, 401D, 401G, 401H, 401I, 401K-Q, 401S-U, 401W, 401X, 401Z, 401AA, and 401DD. Where the count limit is set as twenty, the series 400 of intervals would result a determination that database as unhealthy, as the quantity of intervals 401A-DD covering the time window include a twenty-one intervals in which at least one wait time was exceeded.

In some exemplary embodiments, within a given time interval, the volume of connection wait time events that exceeded the wait limit are not considered, as the interval is counted as dirty so long as at least one such event occurred. Embodiments are possible wherein the volume of wait time violations are considered to identify temporary surges in traffic and assessing wait time violation patterns to determine if the violations are likely temporary due to the surge queues or being caused by a failing database.

Values for the time interval duration, time evaluation window duration, count limit, wait limit are described herein as examples, it should be noted that different databases exhibit different normal behavior characteristics depending on the type of database, equipment, resources and operating environment, thus there can be a wide variance in normal wait times and normal database performance behaviors depending on such factors. Thus, in order to identify metrics patterns that predict failing performance, the wait time limit, interval duration, and time window duration will vary and in practice must be set to suit the particular situation. In an embodiment, these parameters can be set and adjusted as needed by a system administrator.

Figure 5:
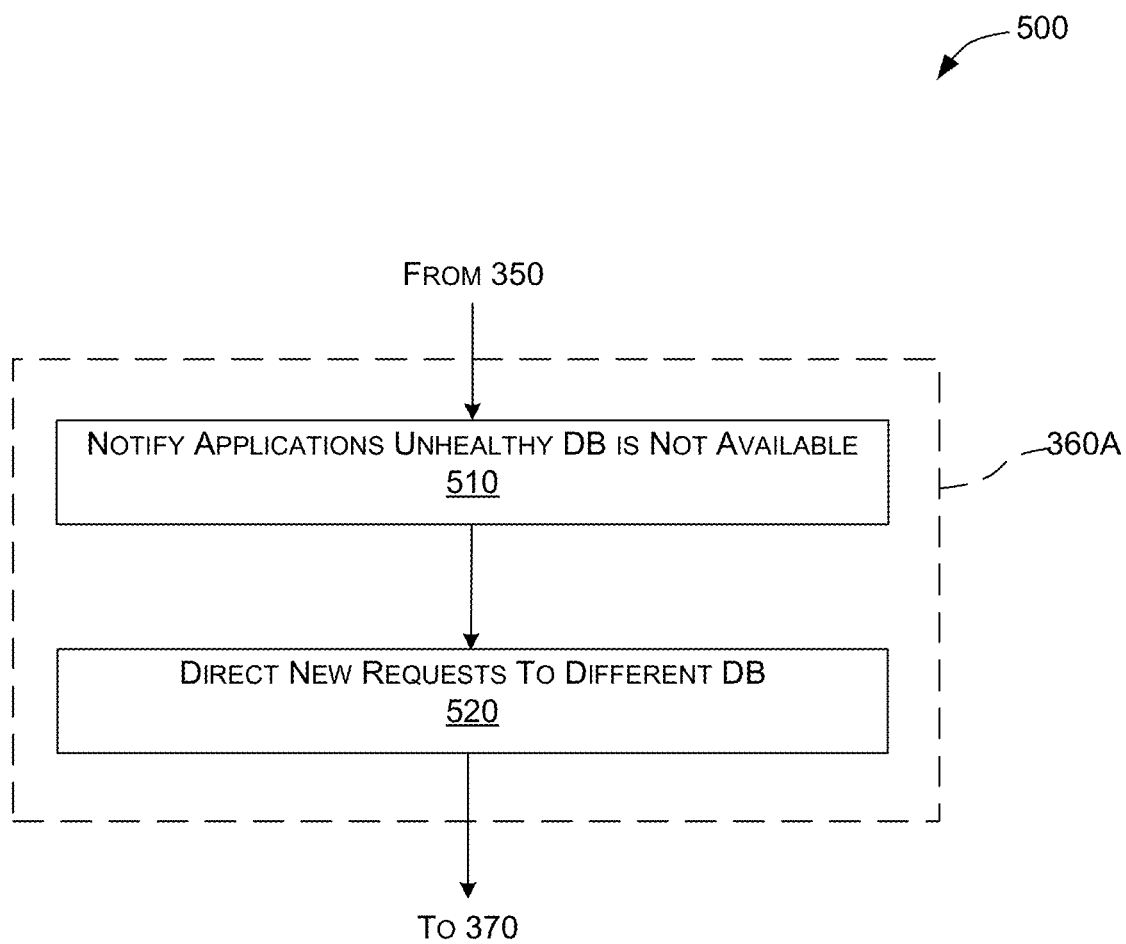
FIG. 5 is a flow chart illustrating an exemplary process for notifying application servers and directing requests to a different database, which can be implemented as a triggered mitigating action operation in the method of FIG. 3.

Turning to FIG. 5, exemplary operation 360A to trigger a mitigating action is illustrated as process 500. Following a determination that the database is unhealthy at operation 350, process 500 executes operation 510 whereby the connection adjuster 135 notifies the requesting applications and application servers that the unhealthy database is not available. At operation 520, new resource requests are directed to at least one different database providing an alternate resource to fulfill the requests. In an embodiment, the connection engine 205 updates the connection pool 130 accordingly, for example to open new connections to the different database as new requests are generated and to close some or all open connections to the unhealthy database.

Figure 6:
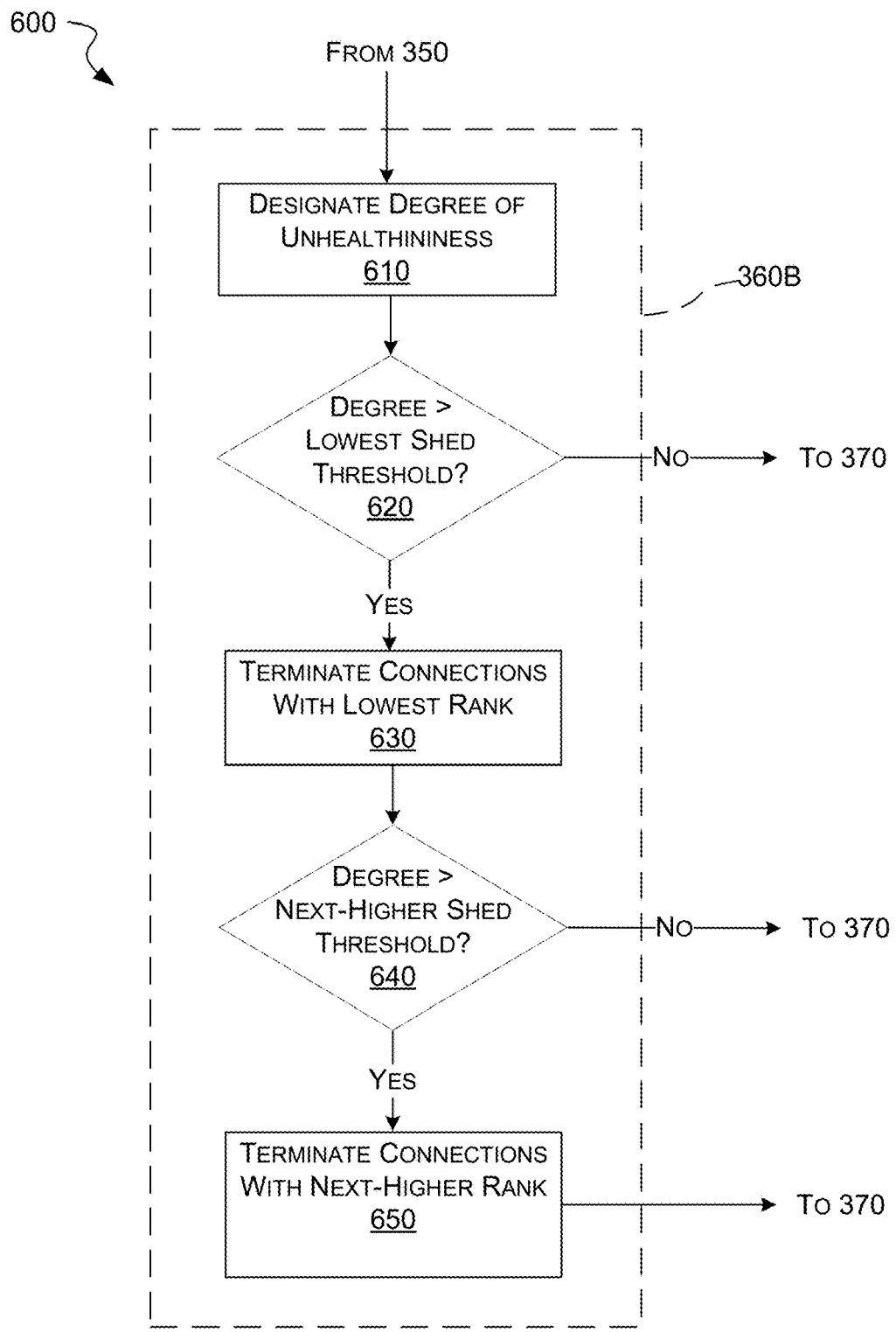
FIG. 6 is a flow chart illustrating an exemplary process for shedding prioritized tiers of connections from an unhealthy database, which can be implemented as a triggered mitigating action operation in the method of FIG. 3.

In FIG. 6, another exemplary operation 360B to trigger a mitigating action involving tiered shedding of connections is illustrated as process 600. By shedding connections in tiers, an overloaded database may have an opportunity to recover while remaining operational, continuing to provide service to priority connections while reversing the declining performance that caused it to be designated as unhealthy at operation 350 (FIG. 3). In the process 600, each database connection request is assigned one of a plurality of ranks. The plurality of ranks define priority levels for maintaining the database connection. The assignment of ranks to request may be a function of the application server, for example, the ranks may be consistent with the bronze, silver, and gold tier database access described above in connection with FIG. 1. Of course, it should be understood, that any number of ranks may be defined, so long as the ranks define a hierarchy of priority for database access. The ranks include at least a lowest rank and a next-higher rank (e.g., a rank above the lowest rank). In the three-tier bronze-silver-gold system, for example, the lowest rank may be bronze, and the next-higher rank may be silver. The highest rank, for example, gold, represents a highest priority group of connections for which a connection must be provided and maintained above all else tier.

Following a determination that the database is unhealthy at operation 350, operation 610 designates a degree of unhealthiness to the database. At operations 620 and 640, the designated degree of unhealthiness is measured against shed thresholds. As will be explained below, exceeding the shed thresholds results in fast shedding of connections from the database in tiered groups associated with the priority ranks.

Different tests may be applied at operation 610 to designate the degree of unhealthiness of the database. One technique can be based at least in part upon the quantity of dirty intervals within the current time evaluation window. An alternate technique for determining a degree of unhealthiness at operation 610, may be based upon volumes of wait time violations within the dirty intervals, or more particularly the number of individual dirty intervals that have a volumes of wait time violations in excess of a volume limit, such as fifty, one hundred, and so on. Such a volume limit can be set as appropriate for the environment. The degree of unhealthiness may be a value on a numerical scale, such as the number of dirty intervals, or the number of dirty intervals with volumes over a volume threshold.

Shed thresholds are provided to trigger shedding of tiers of connections according to their ranks. As shown in FIG. 6 at operation 620, the degree of unhealthiness is compared against a lowest shed threshold. If the degree of unhealthiness is greater than the lowest shed threshold, operation 630 is invoked to terminate connections with the lowest rank. The shed threshold may be set as a value on unit scale used for the degree of unhealthiness.

For example, in a case where the degree of unhealthiness is based on the quantity of dirty intervals within the time evaluation window, the degree may be designated as twenty-five when the quantity is twenty-five. If the low threshold is twenty-four, operation 620 determines that the degree exceeds the lowest shed threshold, thereby triggering operation 630. As shown in FIG. 6 at operation 630, the connection server 125 terminates the connections with the lowest rank from the database, for example the connections assigned a bronze rank. If the degree does not exceed the lowest shed threshold at operation 620, the process goes to operation 370 of routine 300 (FIG. 3).

In the case where the lowest shed threshold is exceeded at operation 620, operation 640 is also invoked. Operation 640 determines if the degree of unhealthiness exceeds a next-higher threshold. For example, if the in a case wherein the degree of unhealthiness is based on the quantity of dirty intervals in the current time evaluation window, the degree may be designated as twenty-seven when the quantity equals twenty-seven. If the next-higher shed threshold is twenty-six, operation 640 determines that the degree exceeds the next-higher shed threshold, thereby invoking operation 650. At operation 650, the connection server 125 terminates connections at the database for connections having the next-higher rank, such as the connections assigned the silver rank. If operation 640 determines the degree does not exceed the net-higher shed threshold, the process goes to operation 370 of routine 300 (FIG. 3).

Figure 7:
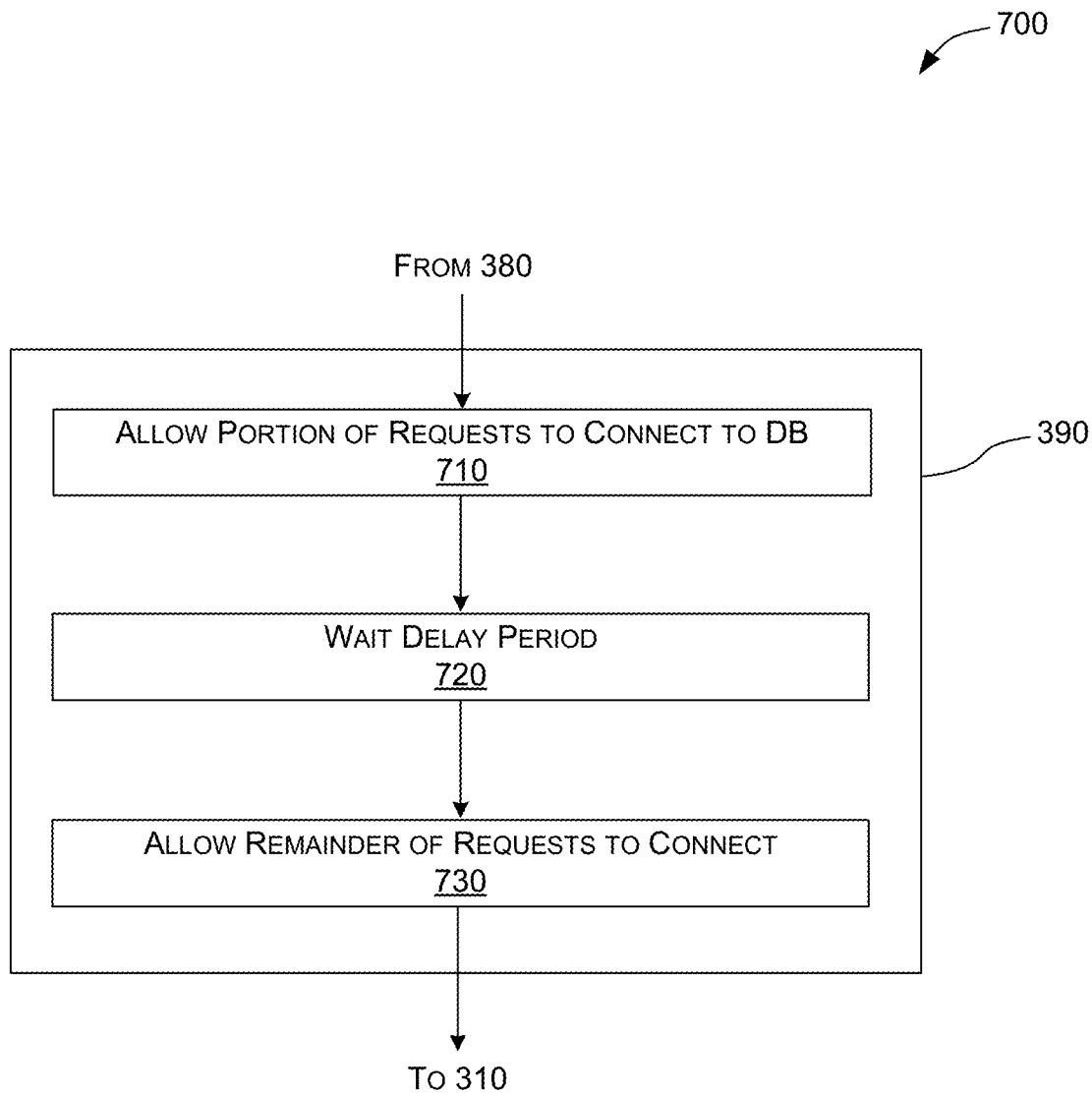
FIG. 7 is a flow chart illustrating an exemplary process for reloading a database that was down which can be implemented as a part of the method of FIG. 3.

FIG. 7 shows an example of operation 390 (FIG. 3) as implementing a process 700 to reload the database after it has recovered and ready for normal operation in the system. The process 700 enables a graceful reentry into service by staggering waiting connection requests seeking to connect with the database. As mentioned above operation 380 has determined that the database meets performance parameters and is ready to be reintroduced to the system. In some high traffic systems, a sudden onrush of all connection requests to a cold database can overload certain operations and create a new failure. To avoid such a problem, at operation 710 the connection engine 205 (FIG. 2) allows a portion of waiting connection requests to connect immediately to the database. By initially allowing only some of the requests, the database has an opportunity to ramp up and reestablish its internal systems, such as cache operations, achieve stable operation without being overloaded. A remainder of the connections are caused to wait for a delay period at operation 720, allowing sufficient time for the database to warm up while processing the initial portion of requests. After the delay period has ended, operation 730 allows the remainder of the requests to connect to the database.

The portion of requests allowed to initially connect can be a predetermined percentage of requests that will suitably reestablish functional operation of the database components while presenting low risk of overloading the cold systems. Although a suitable amount of such initial traffic will vary depending on various factors specific to the operating environment, a suitable portion of requests may be 15% of the total requests allowed to initially connect at operation 710, while 85% of the total requests are caused to wait during the delay period at operation 730. In some embodiments, the requests can be selected randomly, or in other implementations some other criteria may be utilized to select the requests, such as their priority rank. A suitable delay period may also vary depending on the specific operating environment, but in one example a suitable delay period is about ten seconds to ready the database to handle the full onrush of traffic.

Figure 8:
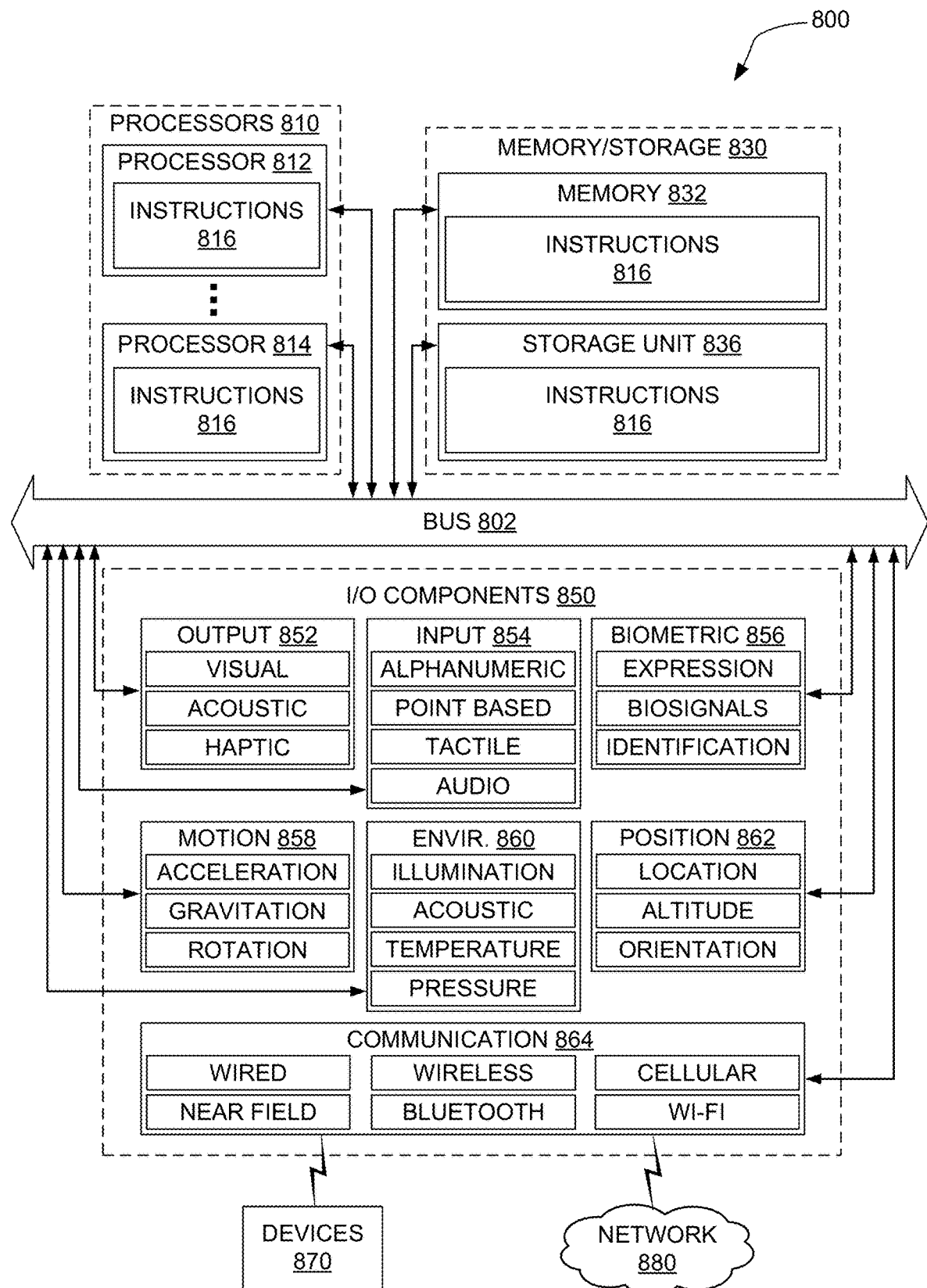
FIG. 8 illustrates a diagrammatic representation of a machine in the form of a computer system within which a set of instructions may be executed for causing the machine to perform any one or more of the methodologies discussed herein, according to an example embodiment.

FIG. 8 is a block diagram illustrating components of a machine 800, according to some example embodiments, able to read instructions from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein can be executed. For example, the instructions 816 can cause the machine 800 to execute the flow diagrams of FIGS. 3 and 5-7. Additionally, or alternatively, the instruction 816 can implement the pool connection engine 205, pool metrics engine 207, wait time engine 210, load level engine 220, throttle engine 230, magnitude violation engine 240, frequency violation engine 250, and so forth. The instructions 816 transform the general, non-programmed machine into a particular machine programmed to carry out the described and illustrated functions in the manner described. In alternative example embodiments, the machine 800 operates as a standalone device or can be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 can comprise, but not be limited to, a server computer, a client computer, a PC, a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 can include processors 810, memory/storage 830, and input/output (I/O) components 850, which can be configured to communicate with each other such as via a bus 802. In an example embodiment, the processors 810 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) can include, for example, processor 812 and processor 814 that may execute instructions 816. The term "processor" is intended to include multi-core processor that may comprise two or more independent processors (sometimes referred to as "cores") that can execute instructions contemporaneously. Although FIG. 8 shows multiple processors 810, the machine 800 may include a single processor with a single core, a single processor with multiple cores (e.g., a multi-core processor), multiple processors with a single core, multiple processors with multiples cores, or any combination thereof.

The memory/storage 830 can include a memory 832, such as a main memory. or other memory storage, and a storage unit 836, both accessible to the processors 810 such as via the bus 802. The storage unit 836 and memory 832 store the instructions 816 embodying any one or more of the methodologies or functions described herein. The instructions 816 can also reside, completely or partially, within the memory 832, within the storage unit 836, within at least one of the processors 810 (e.g., within the processor's cache memory), or any suitable combination thereof, during execution thereof by the machine 800. Accordingly, the memory 832, the storage unit 836, and the memory of the processors 810 are examples of machine-readable media.

As used herein, the term "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) or any suitable combination thereof. The term "machine-readable medium" should be taken to include a single medium or multiple media (e.g., a centralized or distributed database, or associated caches and servers) able to store instructions 816. The term "machine-readable medium" shall also be taken to include any medium, or combination of multiple media, that is capable of storing instructions (e.g., instructions 816) for execution by a machine (e.g., machine 800), such that the instructions, when executed by one or more processors of the machine 800 (e.g., processors 810), cause the machine 800 to perform any one or more of the methodologies described herein. Accordingly, a "machine-readable medium" refers to a single storage apparatus or device, as well as "cloud-based" storage systems or storage networks that include multiple storage apparatus or devices. For the purposes of the claims, the phrase "machine-readable medium," "computer storage medium," "computer-readable storage medium," and variations thereof, does not include waves or signals per se.

The I/O components 850 can include a wide variety of components to receive input, provide output, produce output, transmit information, exchange information, capture measurements, and so on. The specific I/O components 850 that are included in a particular machine will depend on the type of machine. For example, portable machines such as mobile phones will likely include a touch input device or other such input mechanisms, while a headless server machine will likely not include such a touch input device. It will be appreciated that the I/O components 850 can include many other components that are not shown in FIG. 8. The I/O components 850 are grouped according to functionality merely for simplifying the following discussion, and the grouping is in no way limiting. In various example embodiments, the I/O components 850 can include output components 852 and input components 854. The output components 852 can include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 can include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In further example embodiments, the I/O components 850 can include biometric components 856, motion components 858, environmental components 860, or position components 862 among a wide array of other components. For example, the biometric components 856 can include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 858 can include acceleration sensor components (e.g., an accelerometer), gravitation sensor components, rotation sensor components (e.g., a gyroscope), and so forth. The environmental components 860 can include, for example, illumination sensor components (e.g., a photometer), temperature sensor components (e.g., one or more thermometers that detect ambient temperature), humidity sensor components, pressure sensor components (e.g., a barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 862 can include location sensor components (e.g., a GPS receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 850 may include communication components 864 operable to couple the machine 800 to a network 880 or devices 870 via a coupling 882 and a coupling 872, respectively. For example, the communication components 864 include a network interface component or other suitable device to interface with the network 880. In further examples, communication components 864 include wired communication components, wireless communication components, cellular communication components, Near Field Communication (NEC) components, BLUETOOTH® components (e.g., BLUETOOTH® Low Energy), WI-FIR components, and other communication components to provide communication via other modalities. The devices 870 may be another machine or any of a wide variety of peripheral devices (e.g., a peripheral device coupled via a Universal Serial Bus (USB)).

Moreover, the communication components 864 can detect identifiers or include components operable to detect identifiers. For example, the communication components 864 can include Radio Frequency Identification (RFID) tag reader components, NEC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via, the communication components 864, such as location via Internet Protocol (IP) geo-location, location via WI-FIR signal triangulation, location via detecting a BLUETOOTH® or NFC beacon signal that may indicate a particular location, and so forth.

In various example embodiments, one or more portions of the network 880 can be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a WI-FIR network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or other type of cellular or wireless coupling. In this example, the coupling 882 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 816 can be transmitted or received over the network 880 using a transmission medium via a network interface device (e.g., a network interface component included in the communication components 864) and utilizing any one of a number of well-known transfer protocols (e.g., Hypertext Transfer Protocol (HTTP)). Similarly, the instructions 816 can be transmitted or received using a transmission medium via the coupling 872 (e.g., a peer-to-peer coupling) to devices 870. The term "transmission medium" shall be taken to include any intangible medium that is capable of storing, encoding, or carrying the instructions 816 for execution by the machine 800, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these example embodiments without departing from the broader scope of example embodiments of the present disclosure. Such example embodiments of the inventive subject matter may be referred to herein, individually or collectively, by the term "invention" merely for convenience and without intending to voluntarily limit the scope of this application to any single disclosure or inventive concept if more than one is, in fact, disclosed.

The example embodiments illustrated herein are described in sufficient detail to enable those skilled in the art to practice the teachings disclosed. Other example embodiments may be used and derived therefrom, such that structural and logical substitutions and changes may be made without departing from the scope of this disclosure. The Detailed Description, therefore, is not to be taken in a limiting sense, and the scope of various example embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data store are somewhat arbitrary, and particular operations are illustrated in a context of specific illustrative configurations. Other allocations of functionality are envisioned and may fall within a scope of various example embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of example embodiments of the present disclosure as represented by the appended claims. The specification and drawings are, accordingly, to be regarded in an illustrative rather than a restrictive sense.

The disclosure presented herein may be considered in view of the following examples.

Example A: A computer-implemented method of processing a connection request, comprising: receiving database connection requests from a plurality of application servers and directing the database connection requests to a first database; accessing metrics data including a wait time for each database connection request describing how long the request waited until being serviced by an open connection at a first database; determining if at least one of the wait times occurring during a time interval exceeds a wait limit; counting, during a time window comprising a series of intervals, a quantity of the intervals in which the wait limit was exceeded at least once; determining that the first database is unhealthy if the quantity exceeds a predetermined count threshold during the time window; and triggering at least one mitigating action if the first database is determined to be unhealthy.

Example B: The computer implemented method of Example A, wherein the at least one mitigating action includes redirecting new connection requests to a second database.

Example C: The computer-implemented method of Example A, wherein the at least one mitigating action includes notifying the plurality of application servers that the first database is unavailable for connection requests.

Example D: The computer-implemented method of Example A, wherein the time window is a fixed amount of intervals, the time window being refreshed at each new interval.

Example E: The computer-implemented method of Example A, wherein the metrics data further includes a volume of requests received by the first database per interval, and wherein intervals during which the volume of requests exceeds a volume threshold are excluded from the quantity of the counting operation.

Example F: The computer-implemented method of Example A, further comprising: periodically checking at least one performance parameter of the first database to determine if the database is healthy, and, if the database is determined to be healthy, allowing a predetermined portion of connection requests from the plurality of application servers to connect to the first database, while causing a remainder of the requests to wait a predetermined delay period before connecting those requests to the first database.

Example G: The computer-implemented method of Example F, wherein the predetermined portion of connections allowed to connect is about 15%, and the predetermined delay period is about 10 seconds.

Example H: The computer-implemented method of Example F, wherein the performance parameter includes the wait time for at least one dummy connection request, and wherein the first database is determined to be healthy if the wait time does not exceed the wait limit.

Example I: The method of Example A, wherein each database connection request has one of a plurality of ranks, the plurality of ranks defining priority for maintaining the connection, the ranks at least including a lowest rank and a next-higher rank; the method further comprising: when the first database is determined to be unhealthy, designating a degree of unhealthiness based on one or more factors including by how much the quantity exceeds the predetermined count threshold during the time window; wherein the at least one mitigating actions includes: terminating connections assigned the lowest rank if the degree of unhealthiness exceeds a first shed threshold corresponding to the lowest rank; and terminating connections assigned to the next-higher rank if the degree of unhealthiness exceeds a second shed threshold corresponding to the next-lowest rank.

Example J: A system comprising: a processor; and a memory in communication with the processor, the memory having computer-readable instructions stored thereupon that, when executed by the processor, cause the processor to: receive database connection requests from a plurality of application servers and direct the database connection requests to a first database; access metrics data including a wait time for each database connection request describing how long the request waited until being serviced by an open connection at a first database; determine if at least one of the wait times occurring during a time interval exceeds a wait limit; count, during a time window comprising a series of the time intervals, a quantity of the time intervals in which the wait limit was exceeded at least once; determine that the first database is unhealthy if the quantity exceeds a predetermined count threshold during the time window; and trigger at least one mitigating action if the first database is determined to be unhealthy.

Example K: The system of Example J, wherein the at least one mitigating action includes redirecting new connection requests to a second database.

Example L: The system of Example J, wherein the at least one mitigating action includes notifying the plurality of application servers that the first database is unavailable for connection requests.

Example M: The system of Example J, wherein the time window is a fixed amount of intervals, the time window being refreshed at each new interval.

Example N: The system of Example J, wherein the metrics data further includes a volume of requests received by the first database per interval, and wherein intervals during which the volume of requests exceeds a volume threshold are excluded from the quantity of the counting operation.

Example O: The system of Example J, wherein the instructions further cause the processor to: periodically check at least one performance parameter of the first database to determine if the database is healthy, and if the database is determined to be healthy, allow a predetermined portion of connection requests from the plurality of application servers to connect to the first database, while causing a remainder of the requests to wait a predetermined delay period before connecting those requests to the first database.

Example P: The system of Example O, wherein the predetermined portion of connection requests allowed to connect is about 15%, and wherein the predetermined delay is about 10 seconds.

Example Q: The system of Example O, wherein the performance parameter includes the wait time for at least one dummy connection request, and wherein the database is determined to be healthy if the wait time does not exceed the wait limit.

Example R: The system of Example O, wherein each database connection request has one of a plurality of ranks, the plurality of ranks defining priority for maintaining the connection, the ranks at least including a lowest rank and a next-higher rank, wherein the instructions further cause the processor to: when the first database is determined to be unhealthy, designate a degree of unhealthiness based on one or more factors including by how much the quantity exceeds the predetermined count threshold during the time window; wherein the at least one mitigating actions includes: terminating connections assigned the lowest rank if the degree of unhealthiness exceeds a first shed threshold corresponding to the lowest rank; and terminating connections assigned to the next-higher rank if the degree of unhealthiness exceeds a second shed threshold corresponding to the next-lowest rank.

Example S: A system comprising: one or more processors of a machine; and a memory storing instructions that, when executed by the one or more processors, cause the machine to operate a connection service operable to: receive connection requests from a plurality of application servers, the connection requests requesting connections to a database, each connection request having one of a plurality of ranks, the plurality of ranks reflecting a range of priority of maintaining a connection, the ranks at least including a lowest rank and a next-lowest rank; access metrics data relating to performance of the database; determine based on the metrics data if the database is decreasing in performance and designating a degree of unhealthiness based on a magnitude of the decrease; terminate connections assigned the lowest rank if the degree of unhealthiness exceeds a first shed threshold; and terminate connections assigned to the next-higher rank if the degree of unhealthiness exceeds a second shed threshold.

Example T: The system of Example S, wherein the metrics data includes wait times describing how long requests waited until being serviced by an open connection at the database; wherein the instructions further cause the machine to: determine if at least one of the wait times occurring during a time interval exceeds a wait limit; and count, during a time window comprising a series of the time intervals, a quantity of the time intervals in which the wait limit was exceeded at least once; wherein to determine based on the metrics data if the database is decreasing in performance includes determining that the quantity exceeds the predetermined count threshold during the time window; and wherein designating a degree of unhealthiness is based at least in part on a volume of responses in which wait times exceed the wait limit during the time window.

In closing, although the various embodiments have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A computer-implemented method for processing a connection request, comprising:
   receiving database connection requests from a plurality of application servers and directing the database connection requests to a database;
   accessing metrics data including a wait time for each database connection request describing how long the database connection requests waited until being serviced by an open connection at the database;
   determining whether at least one wait time of a plurality of wait times, occurring during a time interval, exceeds a wait limit;
   counting, during a time window including a series of time intervals, a quantity of the time intervals in which the wait limit was exceeded at least once and a quantity of the time intervals in which the wait limit was not exceeded;
   determining a degree of unhealthiness of the database based at least in part by determining that the quantity of the time intervals in which the wait limit was exceeded at least once surpasses a predetermined count threshold during the time window; and
   triggering at least one mitigating action based on the degree of unhealthiness.

2. The computer-implemented method of claim 1, wherein the at least one mitigating action includes shedding one or more tiers of connections from the database.

3. The computer-implemented method of claim 1, further comprising assigning, based on one or more predetermined factors, a rank of a plurality of ranks to each database connection request.

4. The computer-implemented method of claim 3, wherein the plurality of ranks include at least a lowest rank and a next-higher rank.

5. The computer-implemented method of claim 3, further comprising determining that the degree of unhealthiness surpasses a shed threshold corresponding to a next-lowest rank of the plurality of ranks, and wherein the at least one mitigating action includes terminating a connection assigned the next-lowest rank.

6. The computer-implemented method of claim 3, further comprising determining that the degree of unhealthiness surpasses a first threshold corresponding to a lowest rank of the plurality of ranks, and wherein the at least one mitigating action includes terminating a connection assigned the lowest rank.

7. The computer-implemented method of claim 1, wherein the at least one mitigating action includes processing fulfilment of connected requests in one or more tiers of connections of the database.

8. The computer-implemented method of claim 1, wherein the at least one mitigating action includes redirecting new connection requests to an additional database.

9. The computer-implemented method of claim 1, wherein the at least one mitigating action includes notifying the plurality of application servers that the database is unavailable for connection requests.

10. The computer-implemented method of claim 1, wherein the at least one wait time of the plurality of wait times occurring during the time interval exceeds the wait limit when the at least one wait time exceeds a normal range for a quality of service.

11. A system comprising:
    a processor; and
    a memory in communication with the processor, the memory having computer-readable instructions stored thereupon that, when executed by the processor, cause the processor to:
      receive database connection requests from a plurality of application servers and direct the database connection requests to a database;
      access metrics data including a wait time for each database connection request describing how long the database connection requests waited until being serviced by an open connection at the database;
      determine whether at least one wait time of a plurality of wait times, occurring during a time interval, exceeds a wait limit;
      count, during a time window including a series of time intervals, a quantity of the time intervals in which the wait limit was exceeded at least once and a quantity of the time intervals in which the wait limit was not exceeded;
      determine a degree of unhealthiness of the database based at least in part by determining that the quantity of the time intervals in which the wait limit was exceeded at least once surpasses a predetermined count threshold during the time window; and
      trigger at least one mitigating action based on the degree of unhealthiness.

12. The system of claim 11, wherein the at least one mitigating action includes shedding one or more tiers of connections from the database.

13. The system of claim 11, wherein the at least one mitigating action includes redirecting new connection requests to an additional database.

14. The system of claim 11, wherein the at least one mitigating action includes notifying the plurality of application servers that the database is unavailable for connection requests.

15. The system of claim 11, wherein the at least one wait time of the plurality of wait times occurring during the time interval exceeds the wait limit when the at least one wait time exceeds a normal range for a quality of service.

16. The system of claim 11, wherein the at least one mitigating action includes reducing a load on resources of the database.

17. The system of claim 11, wherein the time window is a fixed number of intervals, the time window being refreshed at each new interval.

18. The system of claim 11, wherein the metrics data includes a volume of requests received by the database per interval, and wherein intervals during which the volume of requests exceeds a volume threshold are excluded from the quantity of the time intervals in which the wait limit was exceeded at least once.

19. A non-transitory computer-readable storage medium having instructions stored thereupon which, when executed by a processor of a computing device, cause the computing device to:

receive database connection requests from a plurality of application servers and direct the database connection requests to a database;

access metrics data including a wait time for each database connection request describing how long the database connection requests waited until being serviced by an open connection at the database;

determine whether at least one wait time of a plurality of wait times, occurring during a time interval, exceeds a wait limit;

count, during a time window including a series of time intervals, a quantity of the time intervals in which the wait limit was exceeded at least once and a quantity of the time intervals in which the wait limit was not exceeded;

determine a degree of unhealthiness of the database based at least in part by determining that the quantity of the time intervals in which the wait limit was exceeded at least once surpasses a predetermined count threshold during the time window; and trigger at least one mitigating action based on the degree of unhealthiness.

20. The non-transitory computer-readable storage medium of claim 19, wherein the at least one mitigating action includes redirecting new connection requests to an additional database.

* * * * *